US012505965B2

(12) United States Patent
Shih et al.

(10) Patent No.: US 12,505,965 B2
(45) Date of Patent: Dec. 23, 2025

(54) KEY STRUCTURE

(71) Applicant: Acer Incorporated, New Taipei (TW)

(72) Inventors: Yu-Cheng Shih, New Taipei (TW); Yi-Hsuan Yang, New Taipei (TW); Chih-Heng Tsou, New Taipei (TW); Wu-Chen Lee, New Taipei (TW); Cheng-Nan Ling, New Taipei (TW)

(73) Assignee: Acer Incorporated, New Taipei (TW)

( * ) Notice: Subject to any disclaimer, the term of this patent is extended or adjusted under 35 U.S.C. 154(b) by 356 days.

(21) Appl. No.: 18/448,166

(22) Filed: Aug. 11, 2023

(65) Prior Publication Data

US 2024/0194424 A1 Jun. 13, 2024

(30) Foreign Application Priority Data

Dec. 8, 2022 (TW) ................................ 111213541

(51) Int. Cl.
*H01H 13/84* (2006.01)

(52) U.S. Cl.
CPC ......... *H01H 13/84* (2013.01); *H01H 2217/01* (2013.01)

(58) Field of Classification Search
CPC ...... H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| | | | | |
|---|---|---|---|---|
| 11,735,379 B2 * | 8/2023 | Chang | .................... | H03K 17/97 200/345 |
| 2020/0328044 A1 * | 10/2020 | Chao | .................... | H01H 13/705 |
| 2022/0044886 A1 * | 2/2022 | Han | ....................... | H01H 3/125 |

FOREIGN PATENT DOCUMENTS

| | | |
|---|---|---|
| TW | M478900 | 5/2014 |

* cited by examiner

*Primary Examiner* — Ahmed M Saeed
(74) *Attorney, Agent, or Firm* — JCIPRNET

(57) ABSTRACT

A key structure including a base plate, a keycap, a lifting platform, an elastic body, and a reciprocating supporting member is provided. The keycap is disposed above the base plate. The lifting platform is disposed between the base plate and the keycap, and includes a first end part and a second end part opposite to the first end part. The first end part is slidably connected with the keycap, and the second end part is rotatably connected with the keycap. The elastic body is disposed between the base plate and the lifting platform, and two opposite ends of the elastic body contact the base plate and the lifting platform respectively. The reciprocating supporting member is disposed between the base plate and the lifting platform.

9 Claims, 3 Drawing Sheets

KEY STRUCTURE

CROSS-REFERENCE TO RELATED APPLICATION

This application claims the priority benefit of Taiwan application serial no. 111213541, filed on Dec. 8, 2022. The entirety of the above-mentioned patent application is hereby incorporated by reference herein and made a part of this specification.

BACKGROUND

Technical Field

The disclosure relates to a key structure, and in particular to a key structure in a keyboard.

Description of Related Art

As a physical input device in a notebook computer or a personal desktop computer, a keyboard is composed of multiple key structures. During a process of a user operating the keyboard, limited by the relative positional relationship between wrist support points and finger contact points on keycaps, the user tends to unknowingly raise the wrist, resulting in discomfort caused by excessive tension in muscles and posture.

SUMMARY

The disclosure provides a key structure, which helps to improve the comfort in operation.

The disclosure provides a key structure, including a base plate, a keycap, a lifting platform, an elastic body, and a reciprocating supporting member. The keycap is disposed above the base plate. The lifting platform is disposed between the base plate and the keycap, and includes a first end part and a second end part opposite to the first end part. The first end part is slidably connected with the keycap, and the second end part is rotatably connected with the keycap. The elastic body is disposed between the base plate and the lifting platform, and two opposite ends of the elastic body contact the base plate and the lifting platform respectively. The reciprocating supporting member is disposed between the base plate and the lifting platform.

Based on the above, when a finger of the user touches the keycap, the keycap may be forced to incline, preventing the user from unknowingly raising the wrist when pressing down the keycap, so as to improve the comfort when operating the key structure.

In order to make the above-mentioned features and advantages of the disclosure more obvious and easy to understand, the following specific examples are given together with the attached drawings for detailed description as follows.

DESCRIPTION OF THE EMBODIMENTS

Figure 1:
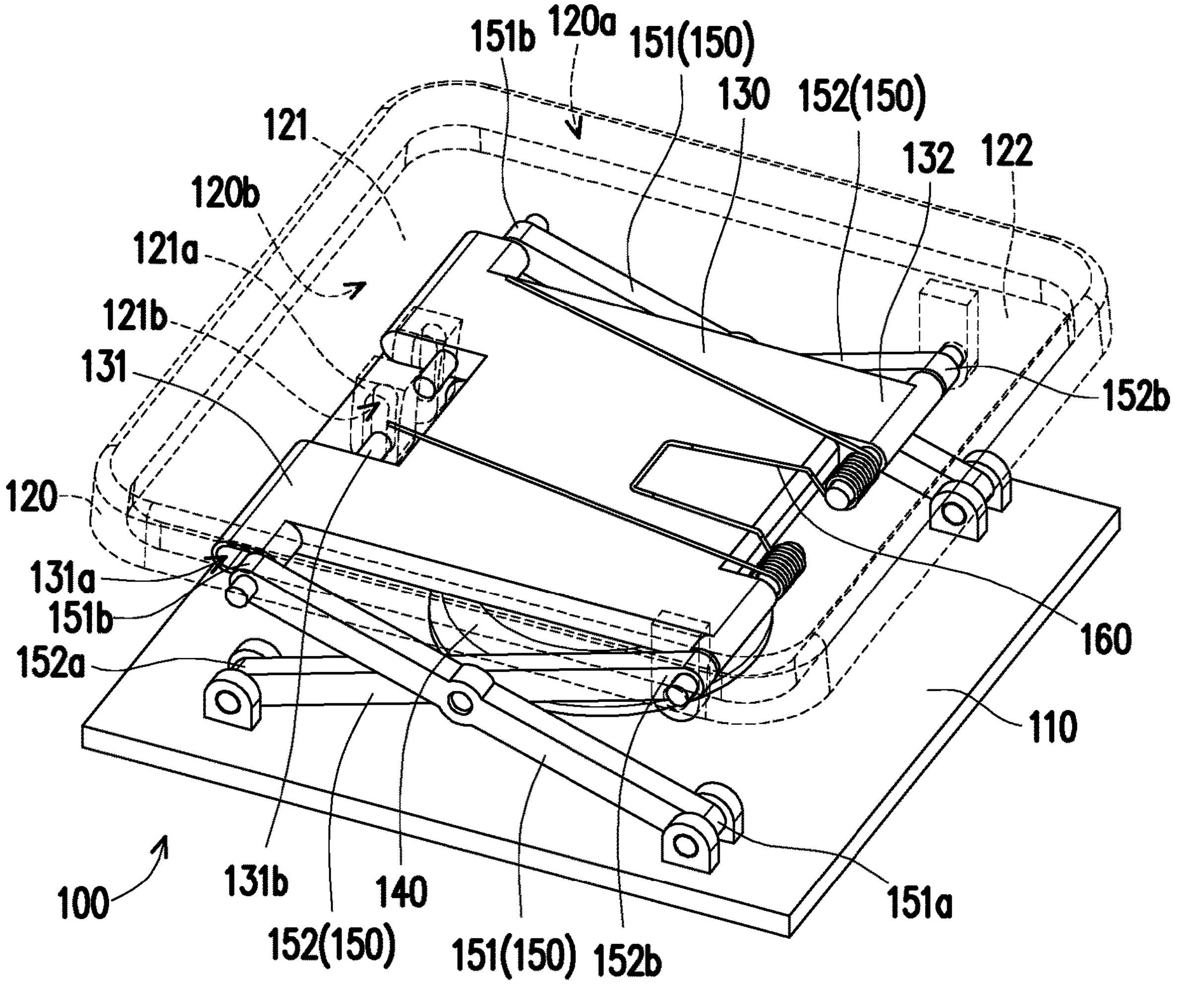
FIG. 1 is a schematic diagram of a key structure according to an embodiment of the disclosure.
Figure 2A:
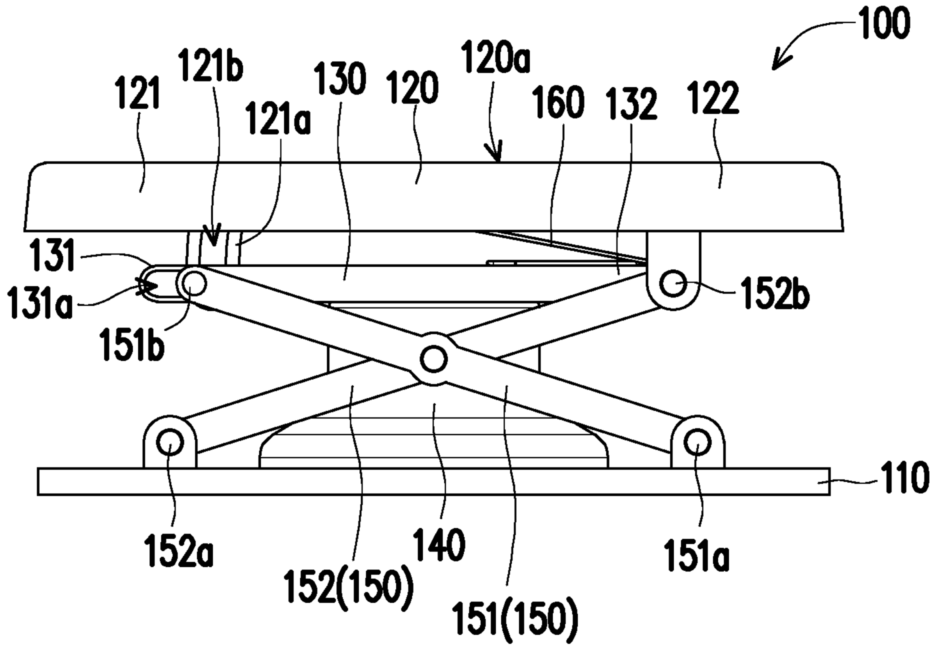
FIG. 2A to FIG. 2C are side view schematic diagrams of an actuation process of a key structure according to an embodiment of the disclosure.
Figure 2B:
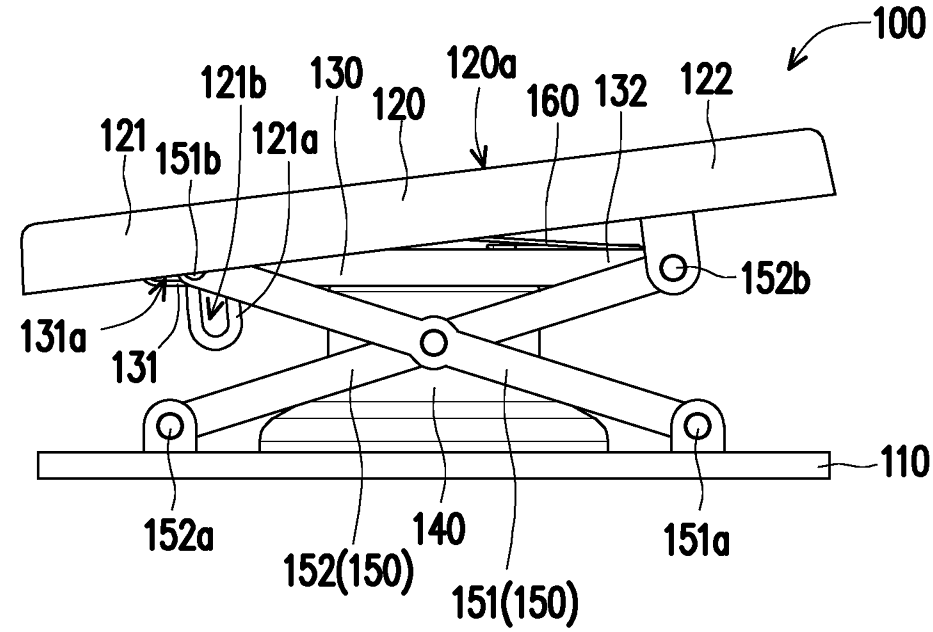
Figure 2C:
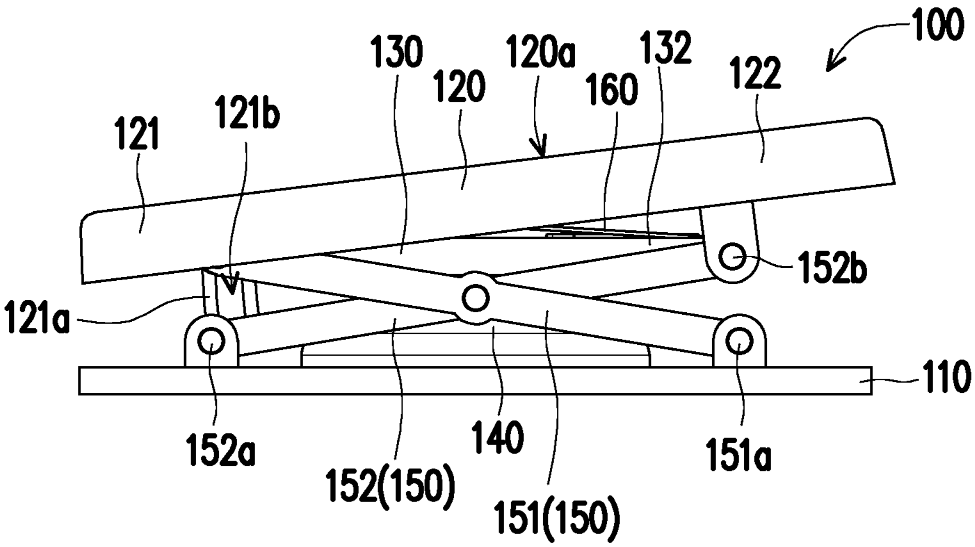

FIG. 1 is a schematic diagram of a key structure according to an embodiment of the disclosure. FIG. 2A to FIG. 2C are side view schematic diagrams of an actuation process of a key structure according to an embodiment of the disclosure. In order to clearly show relative positions and disposition relationships among various components in a key structure 100, a keycap 120 in FIG. 1 is illustrated by dotted lines. Please refer to FIG. 1 and FIG. 2A. In this embodiment, the key structure 100 may be a part of a keyboard and includes a base plate 110, the keycap 120, a lifting platform 130, an elastic body 140, and a reciprocating supporting member 150.

The keycap 120 is disposed above the base plate 110, wherein the lifting platform 130 is disposed between the base plate 110 and the keycap 120, and the keycap 120 is connected with the lifting platform 130. For example, the keycap 120 may be removed from the lifting platform 130 and may be replaced with other keycaps by a user as required. On the other hand, the elastic body 140 may be a dome switch made of rubber, silicon, or other elastic materials and is disposed between the base plate 110 and the lifting platform 130. Two opposite ends of the elastic body 140 contact the base plate 110 and the lifting platform 130 respectively and are suitable for being squeezed by the lifting platform 130 sinking toward the base plate 110 to trigger a thin film circuit (not illustrated) positioned on the base plate 110 and providing an elastic force required for the lifting platform 130 and the keycap 120 to be lifted relative to the base plate 110.

As shown in FIG. 2A to FIG. 2C, the reciprocating supporting member 150 is disposed between the base plate 110 and the lifting platform 130, and is suitable for guiding the lifting platform 130 and the keycap 120 to sink and be lifted along a direction perpendicular to the lifting platform 130. The reciprocating supporting member 150 may be a scissors mechanism and includes a first holder 151 and a second holder 152 pivotally connected with each other. Specifically, a first connection end 151*a* of the first holder 151 is rotatably connected with the base plate 110, and a second connection end 151*b* opposite to the first connection end 151*a* is slidably connected with the lifting platform 130. In addition, a first connection end 152*a* of the second holder 152 is rotatably connected with the base plate 110, and a second connection end 152*b* opposite to the first connection end 152*a* is rotatably connected with the lifting platform 130.

As shown in FIG. 2A to FIG. 2C, the lifting platform 130 includes a first end part 131 and a second end part 132 opposite to the first end part 131, and the keycap 120 includes a sliding end part 121 and a pivoting end part 122 opposite to the sliding end part 121. The second connection end 151*b* of the first holder 151 is slidably connected with the first end part 131 of the lifting platform 130, and the sliding end part 121 of the keycap 120 is slidably connected with the first end part 131 of the lifting platform 130. In addition, a sliding direction of the second connection end 151*b* of the first holder 151 is different from a sliding direction of the sliding end part 121 of the keycap 120. As shown in FIG. 1 and FIG. 2A, the pivoting end part 122 of the keycap 120 and the second connection end 152*b* of the second holder 152 are both rotatably connected with the second end part 132 of the lifting platform 130.

As shown in FIG. 2A to FIG. 2C, when the finger of the user touches the keycap 120, the keycap 120 may be forced to incline downward toward the first end part 131 of the lifting platform 130, preventing the user from unknowingly raising the wrist when pressing down the keycap 120, so as to improve the comfort when operating the key structure 100. In addition, during a process of the user pressing the keycap 120, the lifting platform 130 as a whole sinks toward the base plate 110, so there is enough pressing stroke to squeeze the elastic body 140 and trigger the thin film circuit (not illustrated) positioned on the base plate 110 through the elastic body 140.

Furthermore, during a process of lifting and sinking of the lifting platform 130, the lifting platform 130 is kept parallel to the base plate 110. When the finger of the user does not touch the keycap 120, the keycap 120 is parallel to the lifting platform 130. When the finger of the user touches the keycap 120, the keycap 120 is inclined with respect to the lifting platform 130. During the process of the user pressing the keycap 120, the keycap 120 is inclined with respect to the lifting platform 130 and sinks toward the base plate 110 synchronously with the lifting platform 130. During this period, the lifting platform 130 is kept parallel to the base plate 110, so the keycap 120 is inclined with respect to the base plate 110.

As shown in FIG. 2A to FIG. 2C, when the finger of the user touches the keycap 120, the pivoting end part 122 rotates relative to the second end part 132 of the lifting platform 130, and the sliding end part 121 slides relative to the first end part 131 of the lifting platform 130 to sink relative to the pivoting end part 122, so that the keycap 120 is inclined with respect to the lifting platform 130. During the process of the user pressing the keycap 120, the sliding end part 121 is closer to the base plate 110 than the pivoting end part 122.

As shown in FIG. 1 and FIG. 2A, the key structure 100 further includes a torsion spring 160, wherein the torsion spring 160 is disposed corresponding to the second end part 132 of the lifting platform 130 and the pivoting end part 122 of the keycap 120, and two opposite ends of the torsion spring 160 contact the lifting platform 130 and the keycap 120 respectively. For example, the second end part 132 of the lifting platform 130 may be disposed with a positioning column for the torsion spring 160 to be sleeved thereon. As shown in FIG. 2A to FIG. 2C, when the sliding end part 121 sinks relative to the pivoting end part 122, the torsion spring 160 is squeezed by the keycap 120. When a downward force applied to the keycap 120 is removed, an elastic force of the torsion spring 160 drives the sliding end part 121 to be lifted, so that the keycap 120 returns to a state parallel to the lifting platform 130.

As shown in FIG. 2A to FIG. 2C, the first end part 131 of the lifting platform 130 has a chute 131*a*, wherein the second connection end 151*b* of the first holder 151 is slidably connected with the chute 131*a*, and the chute 131*a* is parallel to the base plate 110, so as to ensure that the lifting platform 130 as a whole may be kept parallel to the base plate 110 when sinking and being lifted. As shown in FIG. 1 and FIG. 2A, the keycap 120 has a pressing surface 120*a* and a base surface 120*b* opposite to the pressing surface 120*a*, and the base surface 120*b* faces the base plate 110. Specifically, the base surface 120*b* of the sliding end part 121 is disposed with a guiding part 121*a* protruding toward the base plate 110, and the first end part 131 of the lifting platform 130 is slidably connected with the guiding part 121*a*.

As shown in FIG. 1 and FIG. 2A, the guiding part 121*a* has an arc-shaped chute 121*b*, the lifting platform 130 further includes a guiding column 131*b* positioned at the first end part 131, and the guiding column 131*b* is slidably connected with the arc-shaped chute 121*b*. As shown in FIG. 1 and FIG. 2A to FIG. 2C, during a process of the sliding end part 121 of the keycap 120 sinking and being lifted relative to the pivoting end part 122, the guiding part 121*a* slides relative to the guiding column 131*b*, and the guiding column 131*b* slides in the arc-shaped chute 121*b*.

In summary, when the finger of the user touches the keycap, the keycap may be forced to incline downward toward the first end part of the lifting platform, preventing the user from unknowingly raising the wrist when pressing down the keycap, so as to improve the comfort when operating the key structure. In addition, during the process of the user pressing the keycap, the lifting platform as a whole sinks toward the base plate, so there is enough pressing stroke to squeeze the elastic body and trigger the thin film circuit positioned on the base plate through the elastic body.

Although the disclosure has been disclosed above with the embodiments, the embodiments are not intended to limit the disclosure. Persons with ordinary knowledge in the technical field may make some changes and modifications without departing from the spirit and scope of the disclosure. Therefore, the scope of protection of the disclosure should be defined by the appended claims.

What is claimed is:

1. A key structure, comprising: a base plate; a keycap, disposed above the base plate; a lifting platform, disposed between the base plate and the keycap, and comprising a first end part and a second end part opposite to the first end part, wherein the first end part is slidably connected with the keycap, and the second end part is rotatably connected with the keycap; an elastic body, disposed between the base plate and the lifting platform, wherein two opposite ends of the elastic body contact the base plate and the lifting platform respectively; a torsion spring, disposed corresponding to the second end part of the lifting platform, wherein two opposite ends of the torsion spring contact the lifting platform and the keycap respectively; and a reciprocating supporting member, disposed between the base plate and the lifting platform.

2. The key structure according to claim 1, wherein the reciprocating supporting member comprises a first holder and a second holder pivotally connected with each other, the first holder and the second holder both comprise a first connection end rotatably connected with the base plate and a second connection end opposite to the first connection end, the second connection end of the first holder is slidably connected with the lifting platform, and the second connection end of the second holder is rotatably connected with the lifting platform.

3. The key structure according to claim 2, wherein the lifting platform has a chute positioned at the first end part, and the second connection end of the first holder is slidably connected with the chute.

4. The key structure according to claim 2, wherein the second connection end of the second holder is rotatably connected with the keycap.

5. The key structure according to claim 1, wherein the keycap has a pressing surface and a base surface opposite to the pressing surface, the base surface faces the base plate, the base surface is disposed with a guiding part protruding toward the base plate, and the first end part of the lifting platform is slidably connected with the guiding part.

6. The key structure according to claim 5, wherein the guiding part has an arc-shaped chute, the lifting platform further comprises a guiding column positioned at the first end part, and the guiding column is slidably connected with the arc-shaped chute.

7. The key structure according to claim 1, wherein the lifting platform is kept parallel to the base plate.

8. The key structure according to claim 1, wherein the keycap is parallel to the lifting platform, and as the keycap and the lifting platform move toward the base plate, the keycap is inclined with respect to the lifting platform.

9. The key structure according to claim 1, wherein the keycap is parallel to the base plate, and as the keycap moves toward the base plate, the keycap is inclined with respect to the base plate.

* * * * *